US00RE47973E

(19) United States
(12) Reissued Patent
Ramb et al.

(10) Patent Number: US RE47,973 E
(45) Date of Reissued Patent: May 5, 2020

(54) TURBOCHARGER

(71) Applicant: BorgWarner Inc., Auburn Hills, MI (US)

(72) Inventors: Thomas Ramb, Worms (DE); Dietmar Metz, Meckenheim (DE)

(73) Assignee: BorgWarner Inc., Auburn Hills, MI (US)

(21) Appl. No.: 15/831,660

(22) Filed: Dec. 5, 2017

Related U.S. Patent Documents

Reissue of:
(64) Patent No.: 9,506,371
Issued: Nov. 29, 2016
Appl. No.: 14/235,538
PCT Filed: Jul. 24, 2012
PCT No.: PCT/US2012/047944
§ 371 (c)(1),
(2) Date: Jan. 28, 2014
PCT Pub. No.: WO2013/022597
PCT Pub. Date: Feb. 14, 2013

(30) Foreign Application Priority Data

Aug. 8, 2011 (DE) ..... 10 2011 109 733

(51) Int. Cl.
*F01D 17/16* (2006.01)
*F02B 37/24* (2006.01)

(52) U.S. Cl.
CPC ..... *F01D 17/165* (2013.01); *F02B 37/24* (2013.01); *F05D 2220/40* (2013.01); *F05D 2260/50* (2013.01); *F05D 2260/60* (2013.01); *Y02T 10/144* (2013.01)

(58) Field of Classification Search
CPC ..... F02B 37/24; F01D 17/165; F02C 6/12; F05D 2220/40
See application file for complete search history.

(56) References Cited

U.S. PATENT DOCUMENTS 4,741,666 A * 5/1988 Shimizu ..... F01D 17/165 415/158
6,736,595 B2 * 5/2004 Jinnai ..... F01D 17/165 29/889.22
6,907,733 B2 * 6/2005 Nishiyama ..... F01D 17/165 29/889.22
7,886,536 B2 * 2/2011 Hemer ..... F01D 17/165 415/159

(Continued)

*Primary Examiner* — Sara S Clarke
(74) *Attorney, Agent, or Firm* — Eric L. Doyle; Stephan A. Pendorf; Patent Central LLC

(57) ABSTRACT

A turbocharger (1) with variable turbine geometry (VTG) having a guide grate (18) which surrounds a turbine wheel (4) radially at the outside, which has an adjusting ring (5) operatively connected to the guide blades (7) via associated blade levers (20) which are fastened to blade shafts (8) at one of the ends thereof. Each blade lever (20) has a lever head (23) which can be placed in engagement with an associated engagement recess (24), which has a base wall (26), of the adjusting ring (5), and which has a stop (25) at least for setting the minimum throughflow through the nozzle cross sections formed by the guide blades (7). The stop is a first support point (25) on the base wall (26), wherein, in the minimum throughflow position, the lever head (23) makes contact, via a wall surface (27) facing toward the base wall (26), with said first support point.

5 Claims, 3 Drawing Sheets

(56) References Cited

U.S. PATENT DOCUMENTS

Figure 1:
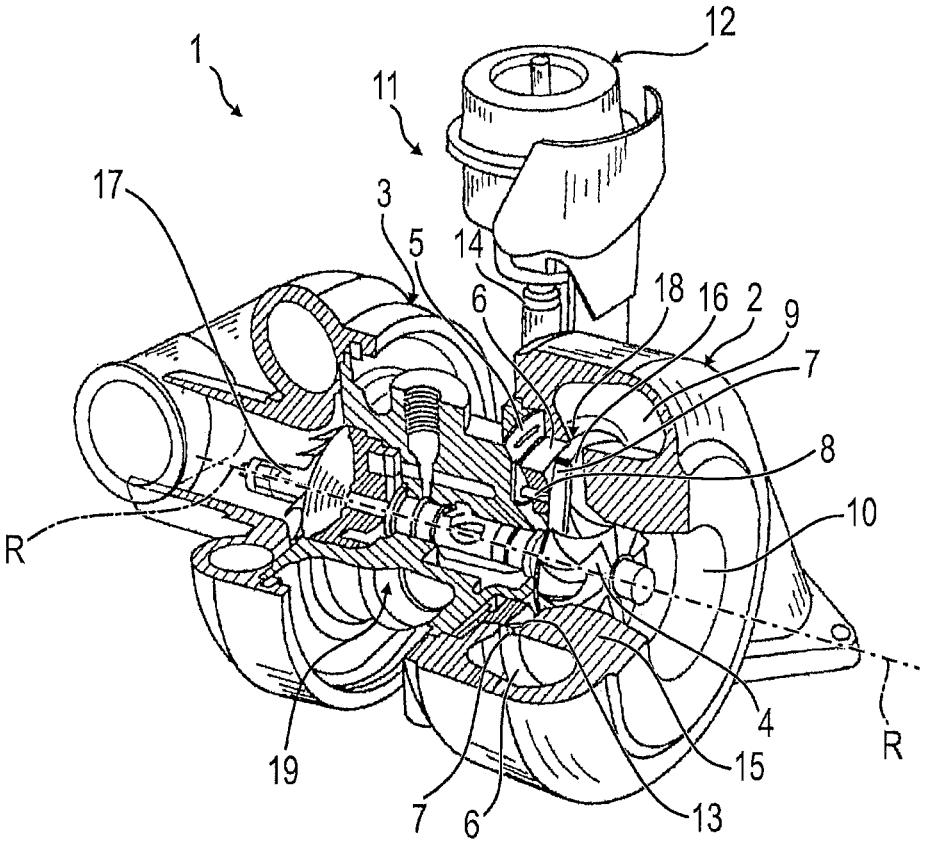

| | | | | |
|---|---|---|---|---|
| 8,328,520 | B2 * | 12/2012 | Boening | F01D 17/165 416/160 |
| 8,545,173 | B2 * | 10/2013 | Valin | F01D 17/165 415/164 |
| 8,668,443 | B2 * | 3/2014 | Espasa | F01D 17/165 415/160 |
| 8,992,166 | B2 * | 3/2015 | Ramb | F01D 17/165 415/159 |
| 2008/0031728 | A1 * | 2/2008 | Sausse | F01D 17/165 415/160 |
| 2011/0182717 | A1 * | 7/2011 | Tries | F01D 17/165 415/160 |
| 2013/0180106 | A1 * | 7/2013 | Ramb | F01D 17/165 29/888.024 |

* cited by examiner

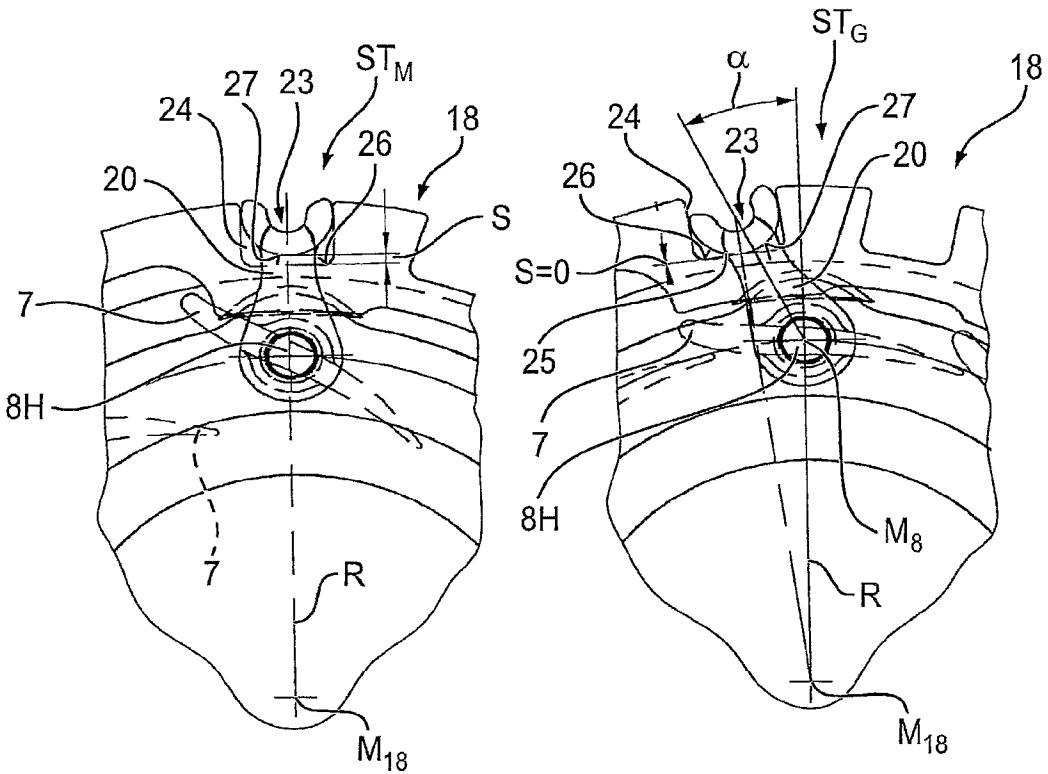
FIG. 3
FIG. 4
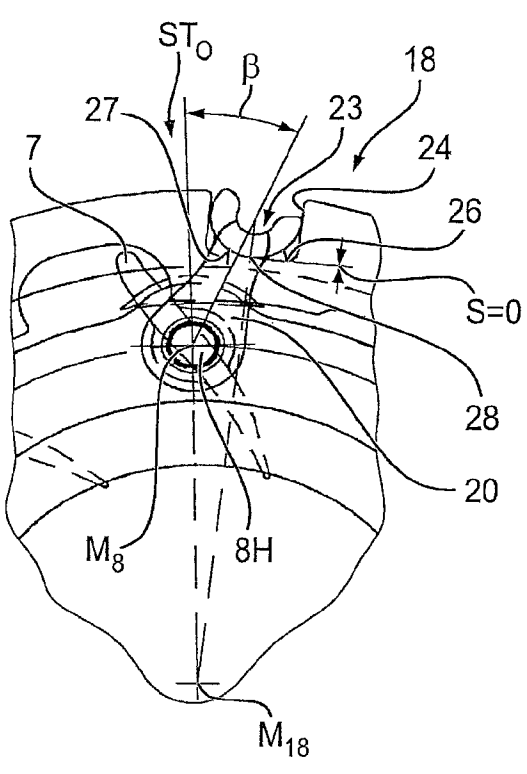
FIG. 5

TURBOCHARGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The invention relates to an exhaust-gas turbocharger.

A turbocharger of said type is known from EP 1 564 380 A1. To prevent weakening of the adjusting ring, said document proposes that a stop be provided which is integrally connected to the adjusting ring and which is composed of a web, the width of which may be varied or which may be provided with an adjustable headless screw. Said design duly yields, to a certain extent, the facility of an adjustable stop, but a stop constructed in this way would barely be feasible in practice because the spatial conditions would impede the insertion of a headless screw, which would moreover necessitate the provision of an internal thread in the integral stop part, and furthermore a locking facility for the headless screw would have to be provided in order to be able fix the position which has been set. This involves a high level of outlay owing to the extremely restricted spatial conditions in reality, and is therefore undesirable.

However, in the known turbocharger, as a result of the integral formation of the stop on the adjusting ring, it is possible only with relatively high outlay, if at all, to rework the projection of the stop after the assembly of the guide grate, for example if a correction of the end positions of the guide grate must be performed.

It is therefore an object of the present invention to provide a turbocharger, which turbocharger permits a simplification of the assembly of the guide grate or guide apparatus, wherein at least a simple and precise setting of the minimum throughflow should be possible by means of the guide apparatus alone.

According to the invention, it is consequently possible for the guide blade position in the cartridge or the guide grate to be realized by means of an inner stop between the adjusting ring and the blade lever or blade lever head. It is thereby possible for in each case one stop to be provided for the smallest blade position and preferably the largest blade position, without the need for additional components.

Figure 2:
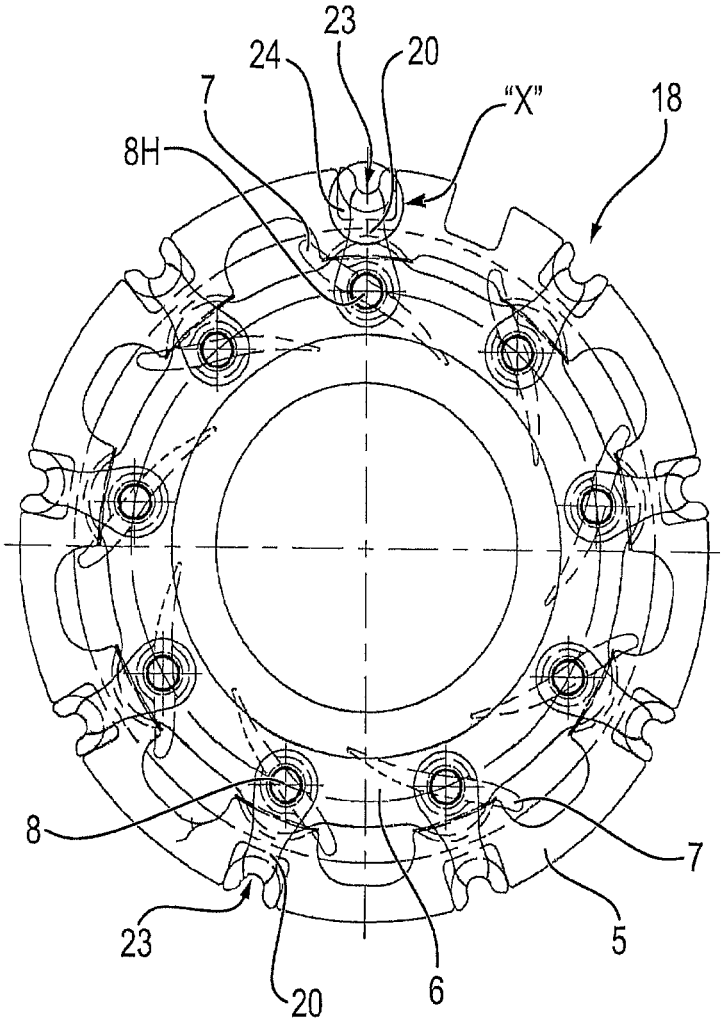

Further details, features and advantages of the invention will emerge from the following description of an exemplary embodiment on the basis of the drawing, in which:

FIG. 1 shows a sectional perspective illustration of the basic design of a turbocharger according to the invention, FIG. 2 shows a plan view of the guide grate according to the invention, and FIGS. 3-5 show detail views of the guide grate in different guide blade positions.

FIG. 1 illustrates a turbocharger 1 according to the invention which has a turbine housing 2 and a compressor housing 3 which is connected to said turbine housing via a bearing housing 19. The housings 2, 3 and 19 are arranged along an axis of rotation R. The turbine housing 2 is shown partially in section in order to illustrate the arrangement of a blade bearing ring 6 as part of a radially outer guide grate 18 which has a multiplicity of guide blades 7 which are distributed over the circumference and which have pivot shafts or blade shafts 8. In this way, nozzle cross sections are formed which, depending on the position of the guide blades

7, become larger or smaller and supply a greater or lesser amount of the exhaust gas of an engine, which is supplied via a supply duct 9 and discharged via a central connecting piece 10, to the turbine wheel 4 which is mounted in the center on the axis of rotation R, in order, by means of the turbine wheel 4, to drive a compressor wheel 17 which is seated on the same shaft.

To control the movement or the position of the guide blades 7, an actuating device 11 is provided. Said actuating device may be of any desired form, but a preferred embodiment has a control housing 12 which controls the control movement of a plunger rod 14 fastened thereto in order to transmit the movement thereof to an adjusting ring 5 situated behind the blade bearing ring 6, said movement being converted into a slight rotational movement of said adjusting ring. Between the blade bearing ring 6 and an annular part 15 of the turbine housing 2 there is formed a free space 13 for the guide blades 7. To be able to safeguard said free space 13, the blade bearing ring 6 has integrally formed spacers 16. In the example, three spacers 16 are arranged on the circumference of the blade bearing ring 6 at angular intervals of in each case 120°. It is however possible in principle for more or fewer such spacers 16 to be provided.

FIG. 2 shows a plan view of the guide grate 18 according to the invention, the blade bearing ring 6, the guide blades 7 with the blade shafts 8 thereof, the adjusting ring 5 and the blade levers 20 with the lever heads 23 thereof, wherein in each case two blade levers 20 with lever heads 23 have been illustrated by way of example and representatively of all other arrangements. The detail denoted in FIG. 2 by the letter "X" is reproduced in FIGS. 3 to 5 in different guide blade positions in each case. Accordingly, in each case only one cutout of the guide grate 18 is illustrated.

FIG. 3 shows an intermediate position $ST_M$ of the guide blades 7. FIG. 3 shows that the substantially semi-circular lever head 23 has a wall surface 27 which points toward a base surface 26 of the engagement recess 24. In the intermediate blade position $ST_M$ shown in FIG. 3, there is play S between said wall surface 27 and the base wall 26, as can be seen in detail from the illustration of FIG. 3.

By contrast, FIG. 4 shows the closed position $ST_G$ of the guide blades 7. Here, in the illustration selected in FIG. 4, the blade lever 20 pivots with its lever head 23 through an angle $\alpha$, which may be approximately 25°, to the left. In said position, the play S decreases to a value 0, as indicated in FIG. 4. In said position, the wall surface 27 bears against a first support point 25 of the base wall 26, such that the support point 25 forms the stop (in this case the minimum stop).

In FIG. 5, which shows the open blade position $ST_O$, the blade lever 20 pivots about the central point $M_8$ of the blade shaft 8 through an angle $\beta$ to the right, and contact occurs at a second support point 28 which is likewise situated on the base wall 26 and with which the wall surface 27 makes contact in said position as a maximum stop.

The two support points 25 and 28 are arranged symmetrically with respect to a radius line R which runs through the central point $M_8$ of the blade shaft 8 and which extends from the central point $M_{18}$ of the guide grate 18. In the intermediate blade position illustrated in FIG. 3, the radius line R corresponds to the longitudinal central line of the blade lever 20.

Said arrangement yields in particular the advantage that a defined stop can be formed both for the minimum position and also for the maximum position without the need for additional components to be manufactured and assembled. Each blade lever has its end stop at the inner stop with respect to the adjusting ring at a maximum but also equal angle deflection. As explained on the basis of FIGS. 3 to 5, the operating principle is the same both for the minimum stop and also for the maximum stop. Here, both end positions have the advantage that the guide blades come to rest in a very precise end position.

For the maximum stop, this means a very precise inner circle at the blade ends, which is important in particular for variable turbine geometry exhaust-gas turbochargers which are used for spark-ignition engines.

The solution according to the invention yields, for the minimum stop, a very precise, uniform duct formation with a correspondingly precise throughput characteristic value, which in turn is important for diesel engines.

Furthermore, as stated, the design according to the invention yields the advantage that at least one component, and therefore a number of machining processes on the blade bearing ring, and the associated assembly of such an additional component, can be eliminated. This yields not only a simplification of the design for the same technical effectiveness but also a cost advantage.

In addition to the above written disclosure of the invention, reference is hereby explicitly made to the diagrammatic disclosure thereof in FIGS. 1 to 5.

LIST OF REFERENCE SYMBOLS

1 Turbocharger
2 Turbine housing
3 Compressor housing
4 Turbine wheel
5 Adjusting ring
6 Blade bearing ring
7 Guide blades
8 Blade shaft
8H Blade shaft assigned to the lever head 23
9 Supply duct
10 Axial connecting piece
11 Actuating device
12 Control housing
13 Free space for guide blades 7
14 Plunger element
15 Annular part of the turbine housing 2
16 Spacer/Spacer cam
17 Compressor wheel
18 Guide grate/Guide apparatus (VTG)
19 Bearing housing
20 Blade lever
21 Fastening ring
22 Recess
23 Lever head
24 Engagement recesses
25, 28 Stop (support point)
26 Base wall
27 Wall surface
R Radius lines
$M_8$ Central point of the blade shaft
$M_{18}$ Central point of the guide grate

The invention claimed is:

1. A turbocharger (1) with variable turbine geometry (VTG) having a turbine housing (2) with a supply duct (9) for exhaust gases;

a turbine wheel (4) which is mounted rotatably in the turbine housing (2); and a guide grate (18)

which surrounds the turbine wheel (4) radially at the outside, which has a blade bearing ring (6), which has a multiplicity of guide blades (7) which have in each case one blade shaft (8) mounted in the blade bearing ring (6), which has [an] *a rotatable* adjusting ring (5) operatively connected to the guide blades (7) via associated blade levers (20) which are fastened to the blade shafts (8) at one of the ends thereof, wherein each blade lever (20) has, at the other end, a lever head (23) [which can be placed] in engagement with an associated engagement recess (24), *in the adjusting ring* (*5*), which *engagement recess* (*24*) has a base wall (26), of the adjusting ring (5), and which has a *minimum* stop [(25)] at least for setting the minimum throughflow through the nozzle cross sections formed by the guide blades (7), wherein the minimum stop is a minimum stop support point (25) on the base wall (26) of the engagement recess, wherein, in the minimum throughflow position, the lever head (23) makes contact, via a lever head wall surface (27) facing toward the base wall (26), with said minimum stop support point (25) *so that the adjusting ring* (*5*) *is stopped from further rotating past the minimum stop by the contact between lever head wall surface* (*27*) *of the lever head* (*23*) *and the base wall* (*26*) *of the engagement recess of the adjusting ring* (*5*).

2. The turbocharger as claimed in claim 1 wherein a further stop in the form of a second support point (28) on the base wall (26) is provided, wherein in a maximum throughflow position, the lever head (23) makes contact, via the wall surface (27) facing toward the base wall (26), with said second support point.

3. The turbocharger as claimed in claim 2, wherein the first and second support points (25, 28) are arranged symmetrically with respect to a radius line (R) running through a central point ($M_8$) of the blade shaft (8H) which is assigned to the lever head (23).

4. The turbocharger as claimed in claim 1, wherein, in an intermediate blade position ($ST_M$), there is play (S) between the base wall (26) and the wall surface (27), which points toward said base wall (26), of the lever head (23).

*5. A turbocharger* (*1*) *with variable turbine geometry* (*VTG*) *having*

*a turbine housing* (*2*) *with a supply duct* (*9*) *for exhaust gases;*

*a turbine wheel* (*4*) *which is mounted rotatably in the turbine housing* (*2*)*; and*

*a guide grate* (*18*)

*which surrounds the turbine wheel* (*4*) *radially at the outside,*

*which has a blade bearing ring* (*6*),

*which has a multiplicity of guide blades* (*7*) *which have in each case one blade shaft* (*8*) *mounted in the blade bearing ring* (*6*),

*which has a rotatable adjusting ring* (*5*) *operatively connected to the guide blades* (*7*) *via associated blade levers* (*20*) *which are fastened to the blade shafts* (*8*) *at one of the ends thereof, wherein each blade lever* (*20*) *has, at the other end, a lever head* (*23*) *in engagement with an associated engagement recess* (*24*) *in the adjusting ring* (*5*), *which engagement recess* (*24*) *has a base wall* (*26*), *of the adjusting ring* (*5*), *and*

*which has a maximum stop at least for setting the maximum throughflow through the nozzle cross sections formed by the guide blades (7),*

*wherein the maximum stop is a maximum stop support point (28) on the base wall (26) of the engagement recess, wherein, in the maximum throughflow position, the lever head (23) makes contact, via a lever head wall surface (27) facing toward the base wall (26), with said maximum stop support point (28) so that the adjusting ring (5) is stopped from further rotating past the maximum stop by the contact between lever head wall surface (27) of the lever head (23) and the base wall (26) of the engagement recess of the adjusting ring (5).*

* * * * *